E. M. GEHRMANN.
ASH PAN.
APPLICATION FILED OCT. 16, 1918.
1,318,548.
Patented Oct. 14, 1919.
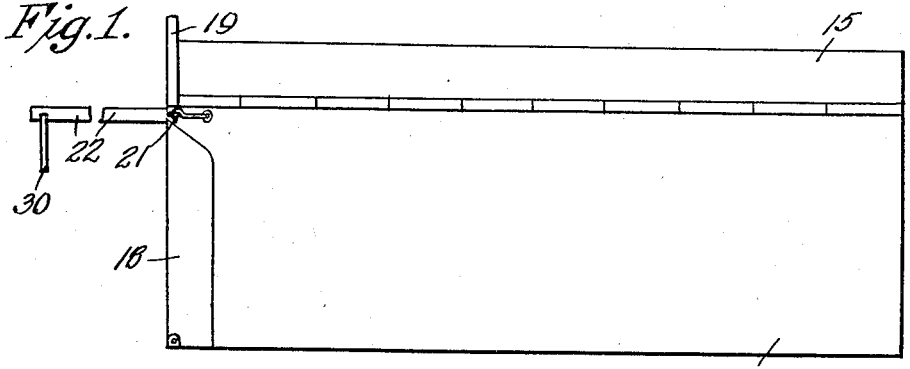
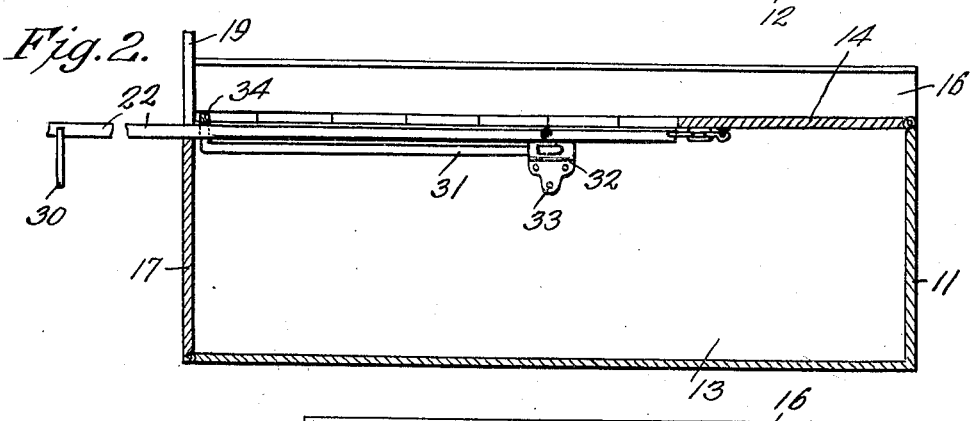
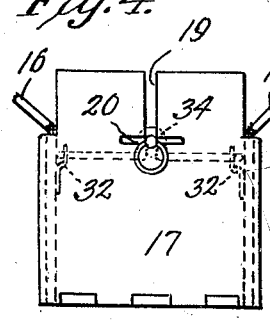
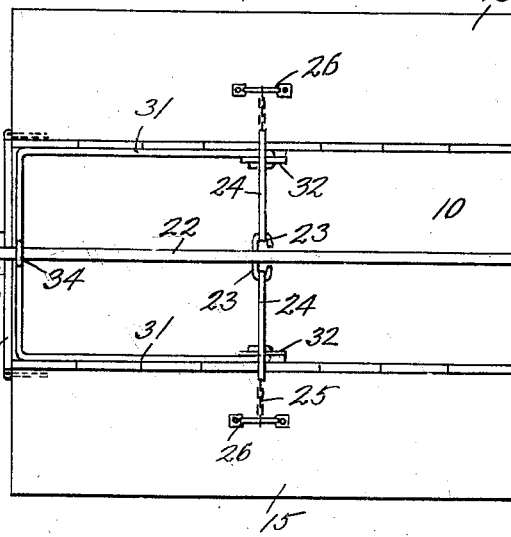
Witnesses
James F. Crown
Ralph Burch
Inventor
Elizabeth M. Gehrmann,
By Richard B. Owen,
Attorney

UNITED STATES PATENT OFFICE.

ELIZABETH M. GEHRMANN, OF SOUTH BELLINGHAM, WASHINGTON.

ASH-PAN.

1,318,548.  Specification of Letters Patent.  Patented Oct. 14, 1919.

Application filed October 16, 1918. Serial No. 258,316.

*To all whom it may concern:*

Be it known that I, ELIZABETH M. GEHRMANN, a citizen of the United States, residing at South Bellingham, in the county of Whatcom and State of Washington, have invented certain new and useful Improvements in Ash-Pans, of which the following is a specification.

This invention relates to receptacles and the object of the same resides in the production of an improved form of ash pan.

More specifically, it is the object of this invention to provide an ash pan with a cover means, permanently connected thereto, which can be opened when the pan is positioned in an ash pit and closed when it is wished to remove the pan therefrom to prevent ashes from being accidentally removed from the pan.

Another object of this invention resides in the production of a device of the kind above described that is simple in construction, efficient in operation and consists of the minimum number of parts.

With these and other objects in view, this invention consists of certain novel constructions, combinations and arrangement of parts, as will be hereinafter fully described and claimed.

In the accompanying drawings:

Figure 1 is a view in side elevation of the improved device with the cover section thereof in a closed position.

Fig. 2 is a longitudinal sectional view taken through the device as shown in Fig. 1.

Fig. 3 is a top plan view of the device with the cover section in an open position, and Fig. 4 is a view in front elevation of the improved device.

Referring to the parts by reference numerals, the body of the pan comprises a base or bottom 10, a rear wall 11 and side walls 12 and 13. Hinged ears are provided on the upper edges of the walls 11, 12 and 13 and the hinged cover section 14 is hingedly secured to the rear wall 11 by means of the hinge ears on the said wall and the side cover sections 15 and 16 are hingedly secured to the side walls 12 and 13 respectively by means of the hinge ears formed on the said walls. It is obvious that the cover sections 14, 15 and 16 have hinge ears that are complemental with the ears on the walls 11, 12 and 13. A front wall 17 is hingedly secured to the forward end of the base or bottom 10, the said front wall 17 having side guards 18 formed integrally therewith and extending at right angles to the plane thereof, the said guards adapted to be positioned against the outside of the side walls 12 and 13, as is clearly shown in Fig. 1. The wall 17 extends above the upper edge of the walls 12 and 13 and that portion of the wall 17 that extends beyond the remainder of the body is provided with a slot 19 running from the upper edge thereof and terminating in a horizontally disposed slot 20. To retain the front wall 17 in a position as shown in the accompanying drawings, I have provided suitable catches 21.

I will now describe the means for operating the door sections 14, 15 and 16. An operating rod 22 is provided, the same being positioned in the slot 19 and resting on the lower edge of the slot 20 that communicates with the slot 19. This is clearly shown in Figs. 2 and 4. This operating rod 22 has formed thereon, intermediately the length thereof, hooks 23 that carry arms 24 which in turn have connected at the outer ends thereof chains 25 to connect the arms with the brackets 26 rigidly connected to the side cover sections 15 and 16. An eye 27 is carried by the end of the rod adjacent the rear cover section 14 and this eye carries therein a chain 28 which has the opposite end thereof carried by the bracket 29 that is secured to the cover section 14. By movement of the rod 22 to a position as shown in Fig. 2 from that as shown in Fig. 3, the cover sections 14, 15 and 16 will be moved to such a position as to prevent the accidental displacement of ashes in the body of the pan. A ring 30 is secured to that portion of the rod 22 that projects beyond the outer face of the front wall 17 of the body of the pan and therefore access can be had to the operating means for the cover at all times. It is to be further noted that when the cover sections are moved to a closed position, the rear cover section 14 is so connected with the rod 22 and the said rod is so positioned relatively to the said section 14 and the side sections 15 and 16 as to efficiently move the section 14 to a position as shown in Fig. 2 and then move the side sections 15 and 16 to a closed position thus overlapping the section 14 and obviating any likelihood of the section 14 protruding above the smooth surface of the side sections and preventing the removal of the pan from the ash pit. Furthermore the front wall 17 extends to such a height as to obviate any likelihood of the ashes being accidentally removed from the pan at that end.

The pan is provided with a rectangular shaped handle 31, formed from a piece of wire having its ends pivotally connected to the bucket ears 32, which are secured to the walls inside the pan by means of rivets or other fasteners 33. The handle closely engages the sides and ends of the pan acting as a reinforcing means. Approximately midway the length of the handle is a twisted portion 34, which is substantially U-shaped, and is adapted to receive the operating rod 22, for holding the same within the slot 19. This handle is used for carrying the pan from one place to another.

It will be noted that when the cover sections are in closed position as shown in Figs. 1 and 2, the hinged end structure 14 will underlie the side cover sections 15 and 16. Therefore, when the operating rod 22 is forced inwardly, it will necessarily raise the end cover section 14, swinging the same in the arc of a circle, whereby the raising of this section 14 will swing the side cover sections 15 and 16 upwardly and outwardly to the position shown in Fig. 3.

After the pan has been inserted in the ash pit and the cover sections thereof opened, the arms 24 extend over the walls 12 and 13 and thus prevent the accidental closing of the side sections. In other words, to close the side sections 15 and 16, the rod 22 must be drawn forward from the position shown in Fig. 3 and by doing so remove that portion of the arms 24 that projects beyond the hinges.

It is obvious that minor changes may be made in the form and construction of this invention, without departing from the material parts thereof. It is therefore not wished to confine the invention to the exact form herein shown and described, but it is wished to include all such as properly come within the scope claimed.

Having thus described my invention, what I claim as new and desire to secure by Letters Patent is:—

In a device of the character described, the combination of a pan body having an end wall of considerable height, side cover sections hinged upon the side walls of said pan and an end cover section hinged upon the remaining end of said pan, said enlarged end wall having a vertical slot therein, an operating rod movable through said slot to be guided in its movement, means for swingably connecting the remaining end of said rod to said end cover section, arms pivotally connected to said rod intermediate its ends, means for yieldably connecting the outer ends of said arms to said side cover sections; of ears fixed within said pan upon the side walls thereof, a U-shaped handle pivotally connected to said bail ears, and fitting closely within said pan, and said handle having a U-shaped looped portion intermediate its end which normally fits over said rod for holding the same within said slot, for the purposes set forth.

In testimony whereof I affix my signature in presence of two witnesses.

MRS. ELIZABETH M. GEHRMANN.

Witnesses:
SARAH A. CARSE,
HELEN C. ANDERSON.

Copies of this patent may be obtained for five cents each, by addressing the "Commissioner of Patents, Washington, D. C."